United States Patent [19]
Watanabe

[11] Patent Number: 5,905,596
[45] Date of Patent: May 18, 1999

[54] TELECENTRIC PROJECTION LENS SYSTEM

[75] Inventor: Fumio Watanabe, Omiya, Japan

[73] Assignee: Fuji Photo Optical Co., Ltd., Saitama, Japan

[21] Appl. No.: 09/028,657

[22] Filed: Feb. 24, 1998

[30] Foreign Application Priority Data

Feb. 25, 1997 [JP] Japan .................................. 9-058321

[51] Int. Cl.$^6$ .......................... G02B 13/22; G02B 15/14; G02B 3/00
[52] U.S. Cl. .......................... 359/663; 359/690; 359/649; 359/651
[58] Field of Search .................................. 359/663, 690, 359/649–651

[56] References Cited

U.S. PATENT DOCUMENTS 4,189,211  2/1980  Taylor ....................................... 359/663
4,249,805  2/1981  Hilbert et al. ............................ 359/663
5,625,495  4/1997  Moskovich ............................... 359/663

Primary Examiner—David Nelms
Assistant Examiner—Evelyn A. Lester
Attorney, Agent, or Firm—Young & Thompson

[57] ABSTRACT

A telecentric projection lens system comprises, in order from the magnifying side to the reducing side, a positive power first lens group including, in order from the magnifying side, at least first and second concave meniscus lens elements and one cemented lens element, a negative power second lens group comprising a concave lens element and a convex meniscus lens element, and a positive power third lens group, and satisfies the following conditions:

$$0.75 < f1/f < 1.20$$

$$f2/f < -1.20$$

$$1.20 < f3/f < 1.70$$

where f is the overall focal length of the telecentric projection lens system at the standard projection distance, f1, f2 and f3 are the focal lengths of the first, second and third lens groups.

12 Claims, 13 Drawing Sheets

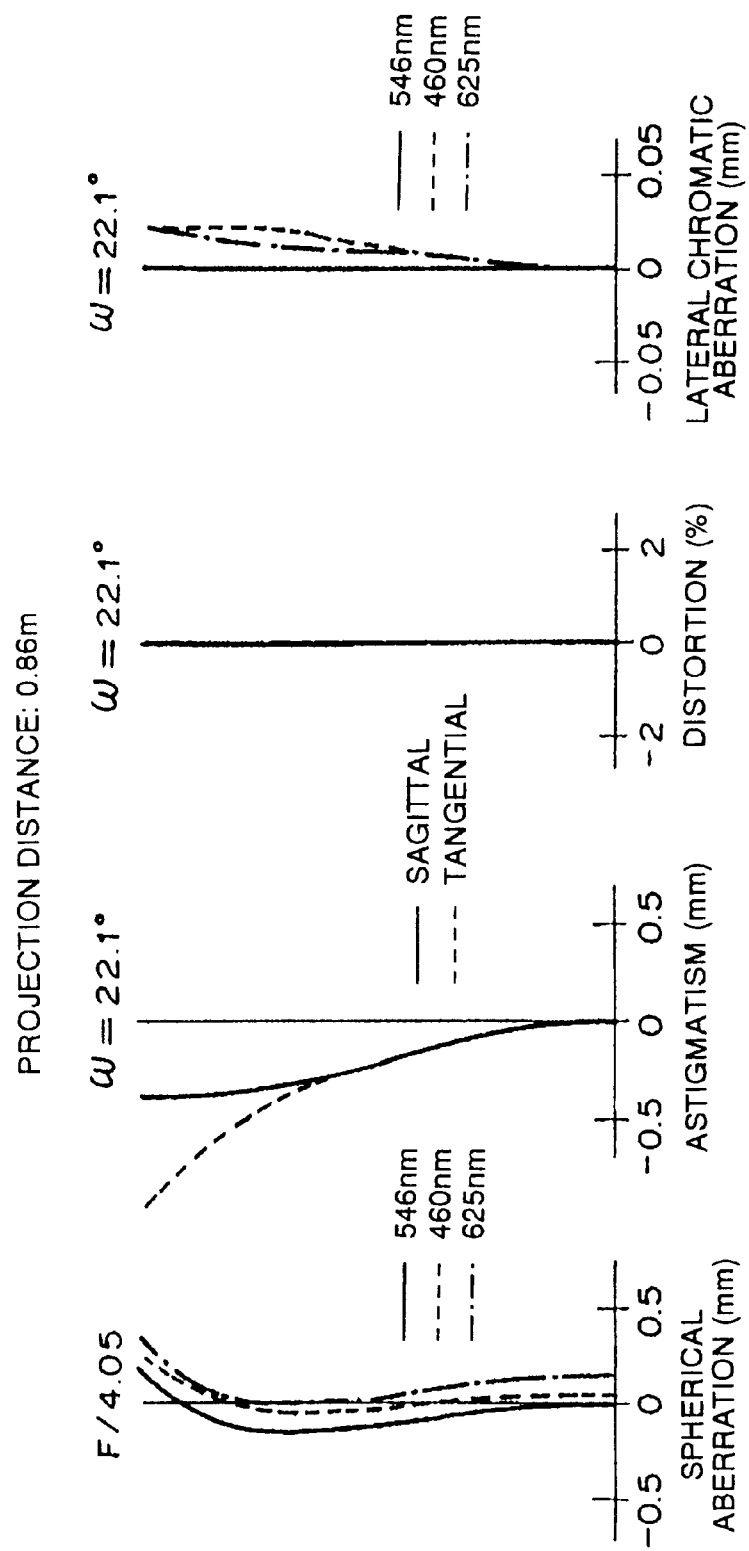

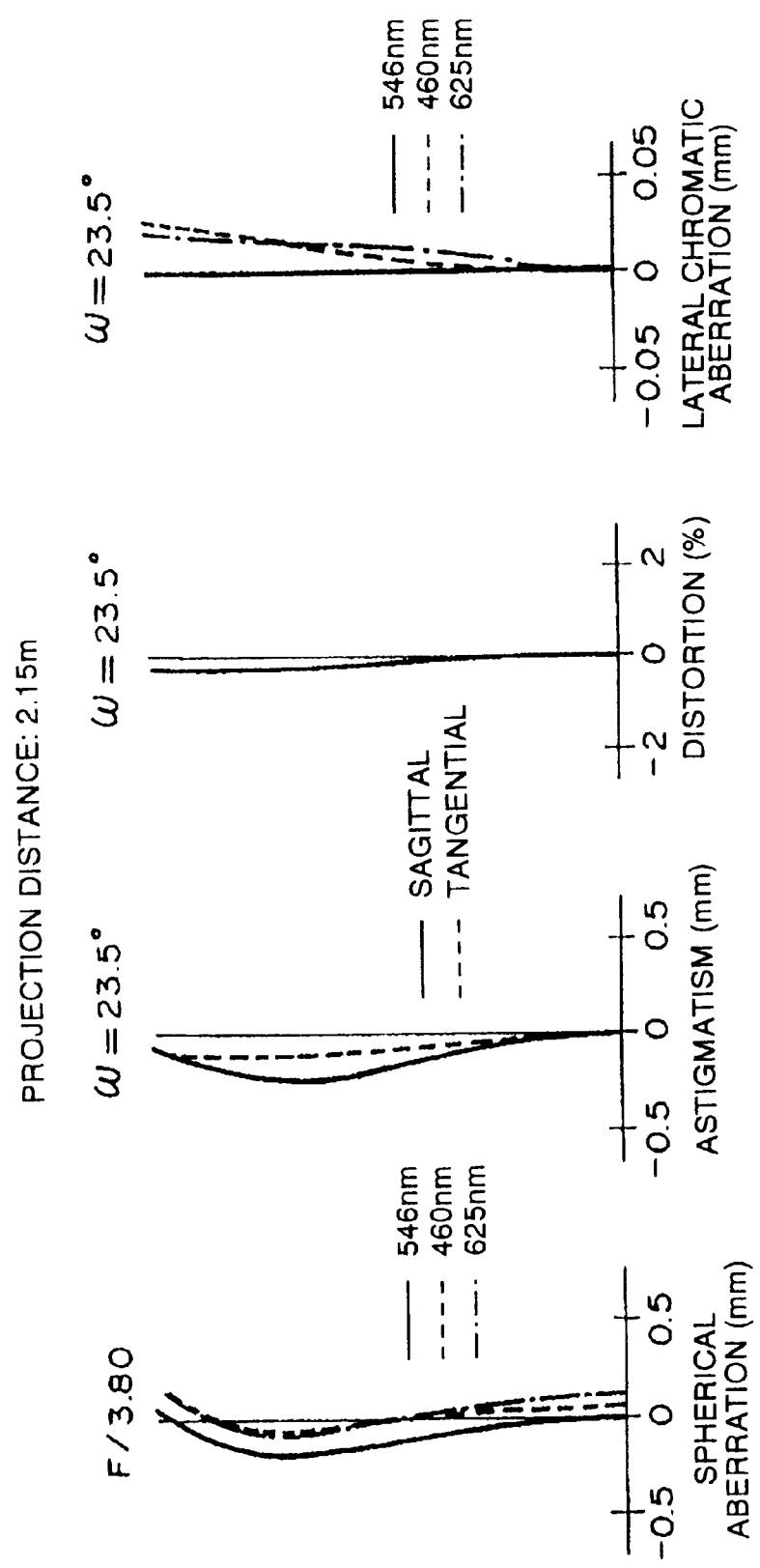

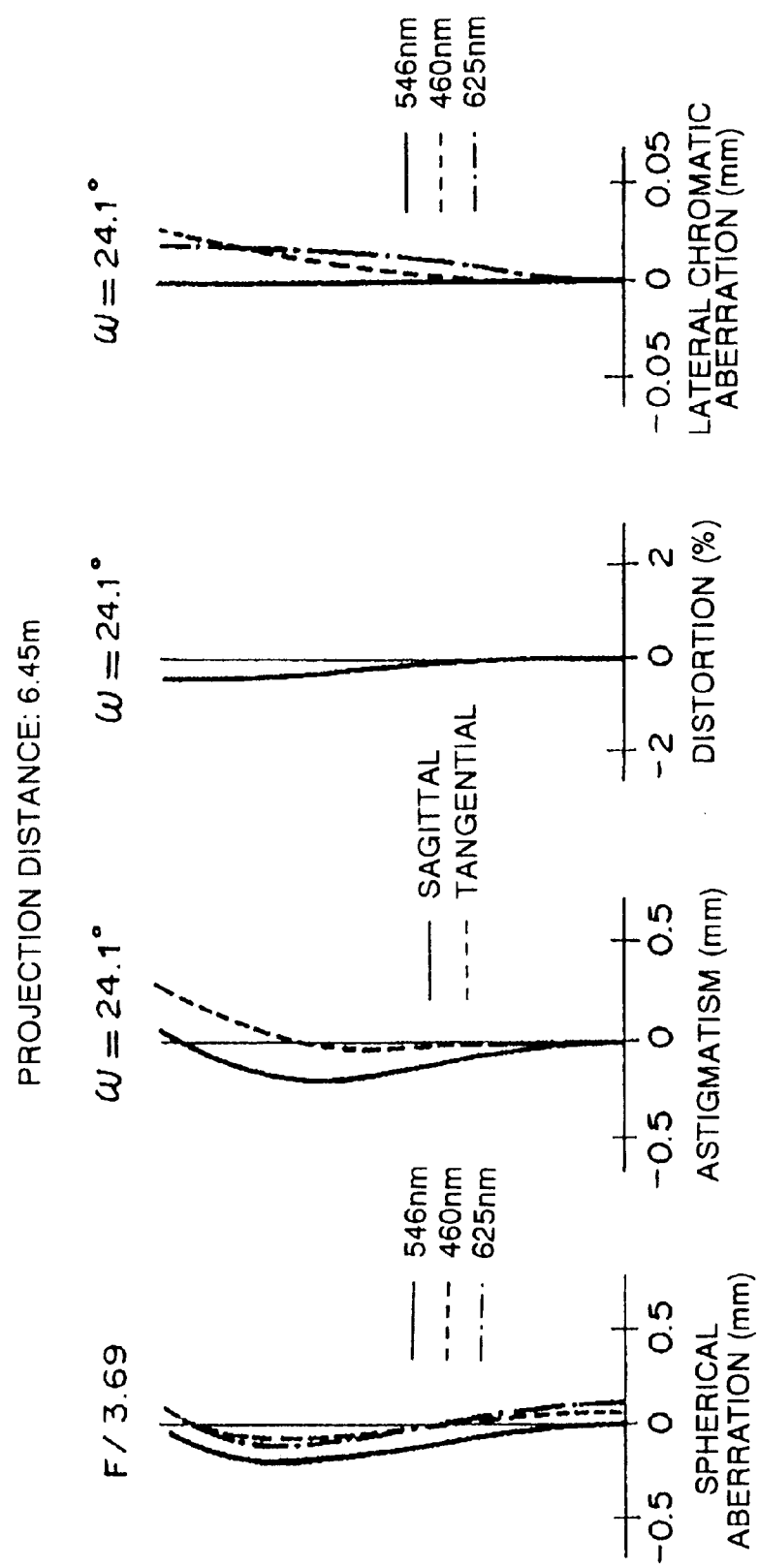

TELECENTRIC PROJECTION LENS SYSTEM

BACKGROUND OF THE INVENTION

1. Field of the Invention

This invention relates to a projection lens for use in a projection apparatus for magnifying and projecting an image on a liquid crystal display screen onto a screen remote from the projection apparatus, and, more particularly, to a telecentric projection lens for use in a projection apparatus which has a color mixing optical element such as a cross prism or a cross mirror assembly for mixing three primary colors disposed between a liquid crystal display screen and the projection lens system.

2. Description of Related Art

Optical lens systens of this type are demanded not only to be compact in overall size but to have high telecentric optical performance, high resolving power, lateral chromatic aberrations and distortion well corrected to provide high quality of photographic images and a wide angle of view. Specifically, because the visibility of liquid crystal display screen is dependent on viewing angles, in order to realize the uniformity in the overall contrast of an image, the projection lens system has to be telecentric. If a telecentric projection lens system is not used in the projection device, a problem of color shading is caused due to a change in optical characteristics of a dichroic prism as the angle at which light rays incident upon the surface of the dichroic prism is varied.

In recent years, there is a tendency for liquid crystal display devices to increases the number of picture elements such as from 640×480 picture elements (VGA) and 800×600 picture elements (SVGA) to 1240×768 picture elements (XGA) and 1280×1024 picture elements (SXGA), which arises a strong demand for projection lens systems having high resolving power and providing high quality of images. Further, in compliance with great wishes to see pictures on a large screen at a short distance in a small room, there is a demand for projection lens systems with a more shorter focal length.

In general, projection devices project a magnified image on a screen placed at a higher level than a place on which the projection device is arranged. For this reason, the projection lens system is usually positioned off upward from the horizontal center axis of the liquid crystal display screen and, consequently, has the necessity of having an angle of view sufficient to cover an area 1.2 to 1.6 times as large as the entire area of liquid crystal display screen.

While it is essential for a compact telecentric projection lens system to include a high power convex lens element on a side of the liquid crystal display screen, the projection lens system must has a back focal distance sufficiently long to install a color mixing optical element in a position in front of the liquid crystal display screen, which requires the projection lens system to include a foremost concave lens like that of a retro-focus type of lens. Such a projection lens system is hard to be provided with a wide angle of view and high optical performance due to the difficulty with corrections of aberrations such as field curvature, astigmatism, distortion and lateral chromatic aberrations. Further, due to a change in aberrations during focusing or projecting distance, it is hard for the projection lens system to have desirable resolving power and provide high quality of projected images over a wide range of projecting distances.

One of projection lens systems for use as a compact telecentric system in projection devices of the type having a liquid crystal display device is described in Japanese Unexamined Patent Publication No. 5-157966. This telecentric projection lens system, however, has the difficulty in being installed to a liquid crystal display device having a large number of picture elements because of its small angle of view and great residual aberrations and further encounters the difficult problem of no sufficient space for a color mixing optical element because of a short back focal distance. One of projection lens systems for use in projection devices of the type having color mixing optical element to be disposed between the projection lens system and a liquid crystal display device is described in Japanese Unexamined Patent Publication No. 5-241071. This projection lens system has a long overall length and a large diameter of foremost lens element, which is always undesirable for the compactness of projection lens system. Further, the projection lens system causes a great change in aberrations due to a change in projecting distance and/or image size and, consequently, encounters the difficult problem in obtaining desirable resolving power over a range of projecting distances from the closest to the longest distance.

SUMMARY OF THE INVENTION

It is accordingly an object of the invention to provide a telecentric projection lens system which has a wide angle of view and high resolving power sufficient to provide high quality of photographic images and is suitable for use in a projection device with a color mixing optical element such as cross prisms or cross mirrors disposed between a liquid crystal display screen and the projection lens system, It is another object of the invention to provide a telecentric projection lens system which prevents or significantly reduces a change in aberrations due to a change in projecting distance and has desirable resolving power and provides high quality of images over a wide range of projecting distances.

The foregoing objects of the invention are accomplished by providing a telecentric projection lens system which is telecentric at its reduction side and comprises, in order from the magnifying side to the reducing side, a positive power first lens group including, from the magnifying side, first and second concave meniscus lens elements and at least one cemented doublet, a negative power second lens group comprising, from the magnifying side, a concave lens element and a convex lens element, and a positive power third lens group. The telecentric projection lens system must satisfy the following conditions:

$$0.75 < f1/f < 1.20 \quad \text{(I)}$$

$$f2/f < -1.20 \quad \text{(II)}$$

$$1.20 < f3/f < 1.70 \quad \text{(III)}$$

wherein f is the overall focal length of the projection lens system, and f1, f2 and f3 are the focal lengths of the first, second and third lens groups, respectively.

The telecentric projection lens system preferably further satisfies the following conditions:

$$N1 < 1.6 \quad \text{(IV)}$$

$$N2 < 1.6 \quad \text{(V)}$$

$$\upsilon 1 < 50 \quad \text{(VI)}$$

$$\upsilon 2 < 50 \quad \text{(VII)}$$

where N1 and N2 are the refraction factors of the first and second concave meniscus lens elements of the first lens group, respectively, and υ1 and υ2 are the dispersions of the first and second concave meniscus lens elements of the first lens group, respectively, as measured by the Abbe Number.

The telecentric projection lens includes at least the positive power first lens group and the negative power second lens group, which provides a sufficient back focal length necessary for a color composing prism to be placed behind the lens system.

The parameters set forth are necessary for suitably balancing aberrations of the telecentric projection lens system, when the lens system is focused across the intended broad range. Satisfaction of these conditions ensures a satisfactory resulving power and high imaging performance and the overall compactness.

The first parameter (0.75<f1/f<1.20) provides the relationship of the focal length of the first lens group relative to the focal length of the projection lens system necessary for the projection lens system to have a wide angle of view and to achieve a high resolving power and high imaging performance. If the under limit is exceeded, spherical aberration is emphasized and, on the other hand, if the upper limit is exceeded, the projection lens system is hardly corrected for lateral chromatic aberration and field curvature, which always impose constrains on the angle of view and the overall compactness.

The use of two concave meniscus lens elements in the first lens group significantly reduces aggravation of astigmatism and ensures the projection lens system well corrected for spherical aberration, coma and field curvature. The use of at least one cemented lens component in the first lens group yields well balanced longitudinal chromatic aberration and lateral chromatic aberration.

The second parameter (f2/f<−1.20) is necessary for the second lens group to prevent or significantly reduce aggravation of field curvature and pincushion distortion which may be caused by the first and third lens groups. If the upper limit is exceeded, spherical aberration and astigmatism are emphasized, which leads to aggravation of the resolving power of the projection lens system.

The third parameter (1.20<f3/f<1.70) relating the third lens group is necessary for the projection lens system to have a wide angle of view and the overall compactness and to achieve a high resolving power and high imaging performance. If the under limit is exceeded, spherical aberration and astigmatism are emphasized, which leads to aggravation of the resolving power of the projection lens system and, on the other hand, if the upper limit is exceeded, the projection lens system is hardly corrected for lateral chromatic aberration, which causes aggravation of the imaging performance of the projection lens system and imposes constrains on the overall compactness of the projection lens system.

While the third lens group has a diameter generally greater than the size of image plane, the use of a single lens element for the third lens group is instrumental in cutting down costs of the projection lens system. In particular the use of a bi-convex lens element significantly reduces aggravation of astigmatism. If a plano-convex lens element or a convex meniscus lens element is employed for the third lens group, the projection lens system causes significant aggravation of astigmatism.

For the most lens systems, focusing is typically accomplished by moving the component lens groups, entirely or partly, relative to one another, which, on one hand, needs only a simple focusing mechanism and, on the other hand, is accompanied by a significant change in various aberrations and aggravation of the resolving power and imaging performance of the lens system over the entire range of focusing. Further, if employing a focusing mechanism which moves the lens groups entirely to accomplish focusing, the lens system causes a great change in field curvature and astigmatism, and because of a necessity of driving a large optical element of a projector to which the lens system is installed, the utilization is inevitably made of a large-sized focusing mechanism. If employing a focusing mechanism which moves only either the first lens group or the second lens group to accomplish focusing, the lens system encounters significant aggravation of coma, field curvature and lateral chromatic aberration. Further, if employing a focusing mechanism which moves the first and second lens groups together to accomplish focusing, while the lens system provides small changes in various aberrations, it is hard to have a wide range of focusing.

The telecentric projection lens of the invention having the first and second lens groups movable relative to each other during focusing satisfies the following condition:

$$0.5 < S2/S1 < 1.0 \quad \text{(VIII)}$$

The telecentric projection lens satisfying the condition (VIII) always has a satisfactory resolving power and satisfactory imaging performance. If any one of the upper and under limits of the parameter is exceeded, it is hard for the telecentric projection lens system to prevent changes in spherical aberration, astigmatism and distortion over the range of focusing.

The first and second lens groups are moved at a fixed relative ratio of movement during focusing, which permits a simplified focusing mechanism and ensures a satisfactory resolving power and satisfactory imaging performance in spite of a change in projection distance.

BRIEF DESCRIPTION OF THE DRAWINGS

The above and other objects and features of the present invention will be understood from the following description of a specific embodiment thereof when considering in conjunction with the accompanying drawings, in which:

FIGS. 11A–11D are graphical views showing curves of spherical aberrations for wavelengths of 460, 546 and 625 nm, astigmatism in sagittal and tangential planes, distortion, and lateral chromatic aberrations for wavelengths of 460, 546 and 625 nm of the telecentric projection lens system of FIG. 10, which is at a short projecting distance of 0.86 m;

FIGS. 12A–12D are graphical views showing curves of spherical aberrations for wavelengths of 460, 546 and 625 nm, astigmatism in sagittal and tangential planes, distortion, and lateral chromatic aberrations for wavelengths of 460, 546 and 625 nm of the telecentric projection lens system of FIG. 10, which is at an intermediate projecting distance of 2.15 m; and FIGS. 13A–13D are graphical views showing curves of spherical aberrations for wavelengths of 460, 546 and 625 nm, astigmatism in sagittal and tangential planes, distortion, and lateral chromatic aberrations for wavelengths of 460, 546 and 625 nm of the telecentric projection lens system of FIG. 10, which is at a long projecting distance of 6.45 m.

DETAILED DESCRIPTION OF THE SPECIFIC EMBODIMENT

Figure 1:
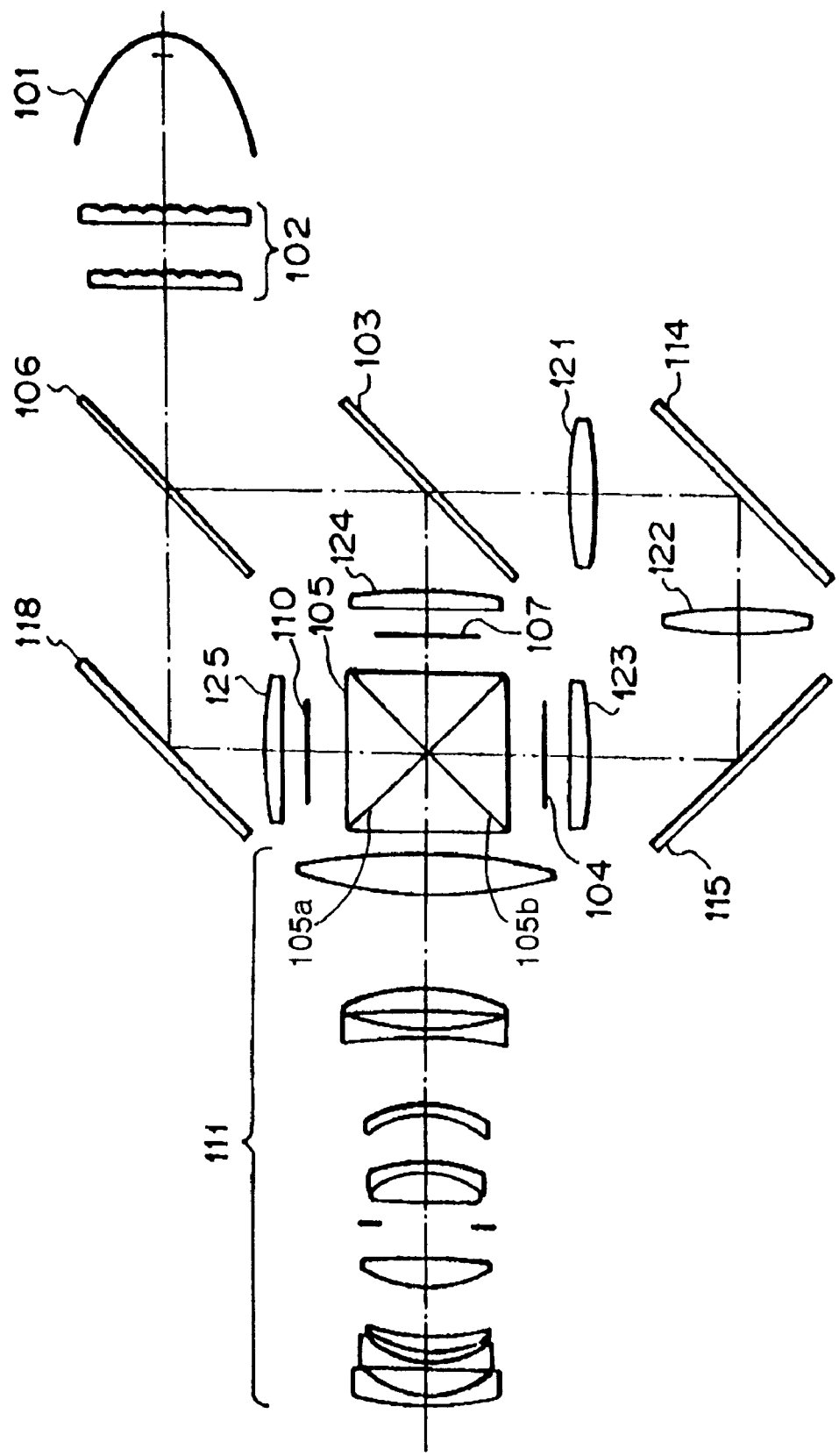
FIG. 1 is a diagrammatic side view of a basic optical structure of a video projector with a liquid crystal display device in which a telecentric projection lens system of the invention is used.

Referring to the drawings in detail, in particular, to FIG. 1 schematically showing a video projector with a liquid crystal display device in which a telecentric projection lens system of the invention is used, the video projector comprises a light source 101, a pair of lens arrays 102, first and second dichroic mirrors 103 and 106, first, second and third total reflection mirrors 114, 115 and 118, mono-color image display panels 104, 107 and 110 such as liquid crystal display panels for red, green and blue, respectively, and a dichroic prism 105 for mixing light rays of three primary colors, i.e. red, green and blue. All these optical elements are well known in various types in the art and may take any well known types. In the light path for red light there is disposed a field lens 121 and a relay lens 122 on opposite sides of the first reflection mirror 114. Further, in each light path there are disposed a field lens 123, 124 or 125 before the liquid crystal display panel 104, 107 or 110 as viewed from the light source 101. A telecentric projection lens system 111 of the invention is disposed in front of the exit surface of the dichroic prism 105. The light source 101 is of a high luminance, white lamp such as a halogen lamp and a metal halide lamp. The light source 101 is typically provided with a filter (not shown) for absorbing ultraviolet light rays and infrared light rays. An air cooling device may be equipped to cool the light source 101 and elements around the light source.

The second dichroic mirror 106 reflects green and red light and transmits blue light, and the first dichroic mirror 103 reflects green light and transmits red light. Each of the dichroic mirror 103 and 106 comprises a base glass plate with a dielectric multi layer film having a given spectral reflection characteristics coated thereon. Each of the mono-color liquid crystal display panels 104, 107 and 110 is of a twisted nematic type such as TN type, STN type and TFT type and driven by video signals from a driver (not shown) to modulate luminance of the primary light and display an image. The dichroic prism 105, which is shaped cubic, comprises four right-angled prisms cemented to one another to form a cube and composing a white light ray from red, green and blue light rays. Each of the interfaces 105a and 105b perpendicular to each other is formed by a dielectric multi layer film which serves as a red light reflection mirror or a blue light reflection mirror having a given spectral characteristic.

The projection lens system 111 projects a magnified color image on a screen at a specified distance from the video projector.

Figure 2:
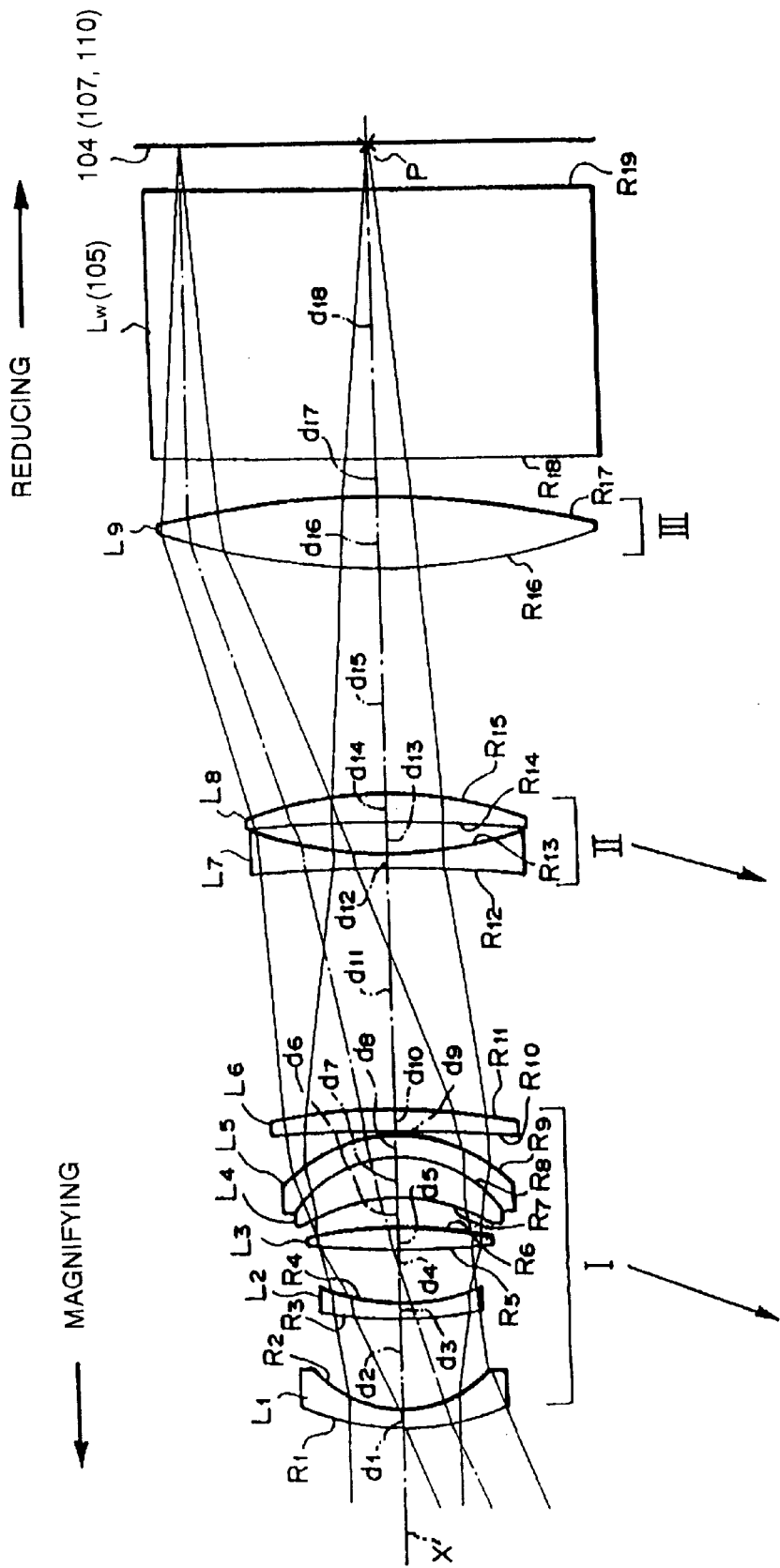
FIG. 2 is a diagrammatic side view of an optical structure of a telecentric projection lens system, which is at a standard projecting distance, in accordance with an embodiment of the invention.
Figure 3:
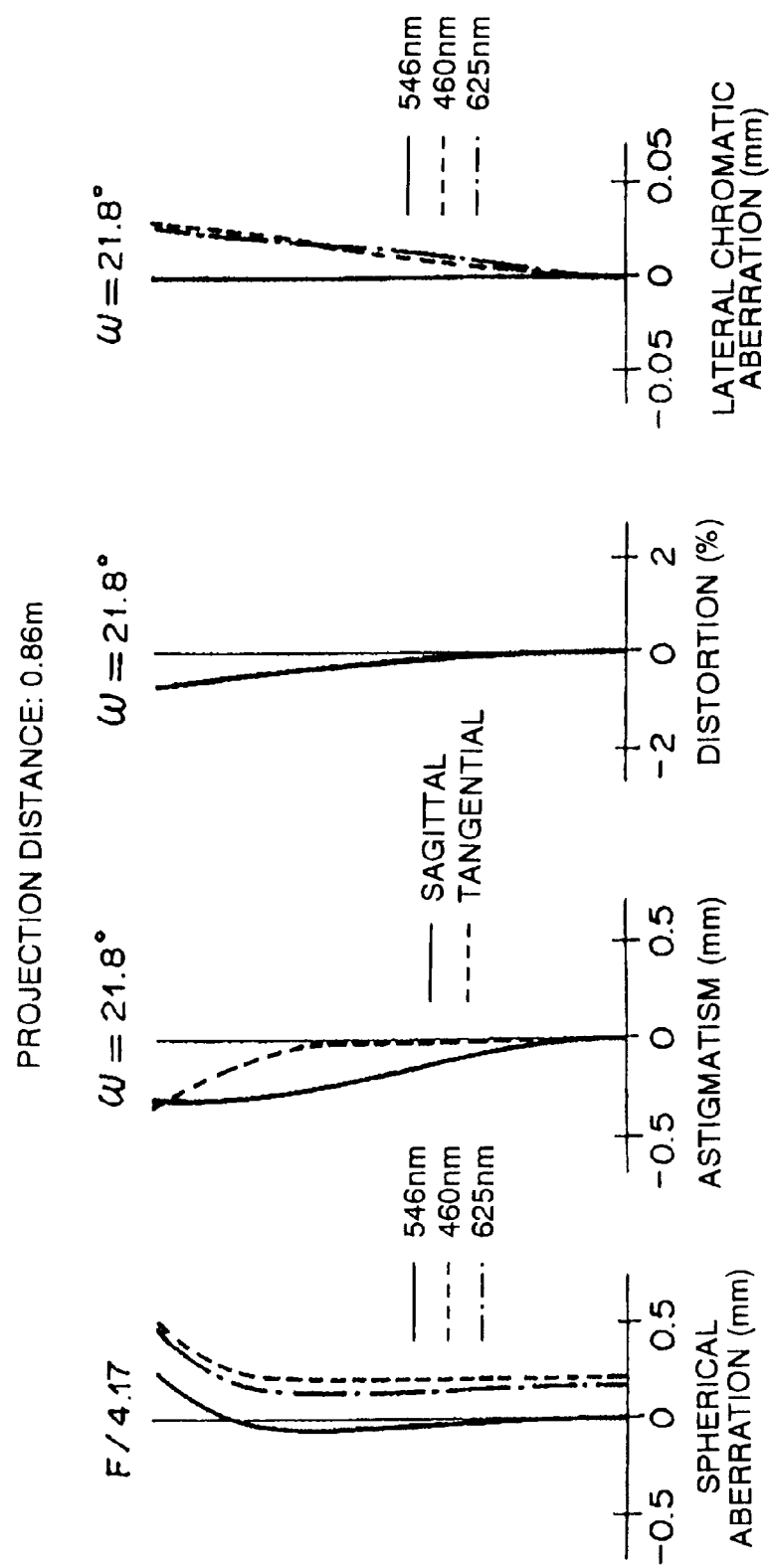
FIGS. 3A–3D are graphical views showing curves of spherical aberrations for wavelengths of 460, 546 and 625 nm, astigmatism in sagittal and tangential planes, distortion, and lateral chromatic aberrations for wavelengths of 460, 546 and 625 nm of the telecentric projection lens system of FIG. 2, which is at a short projecting distance of 0.86 m.
Figure 4:
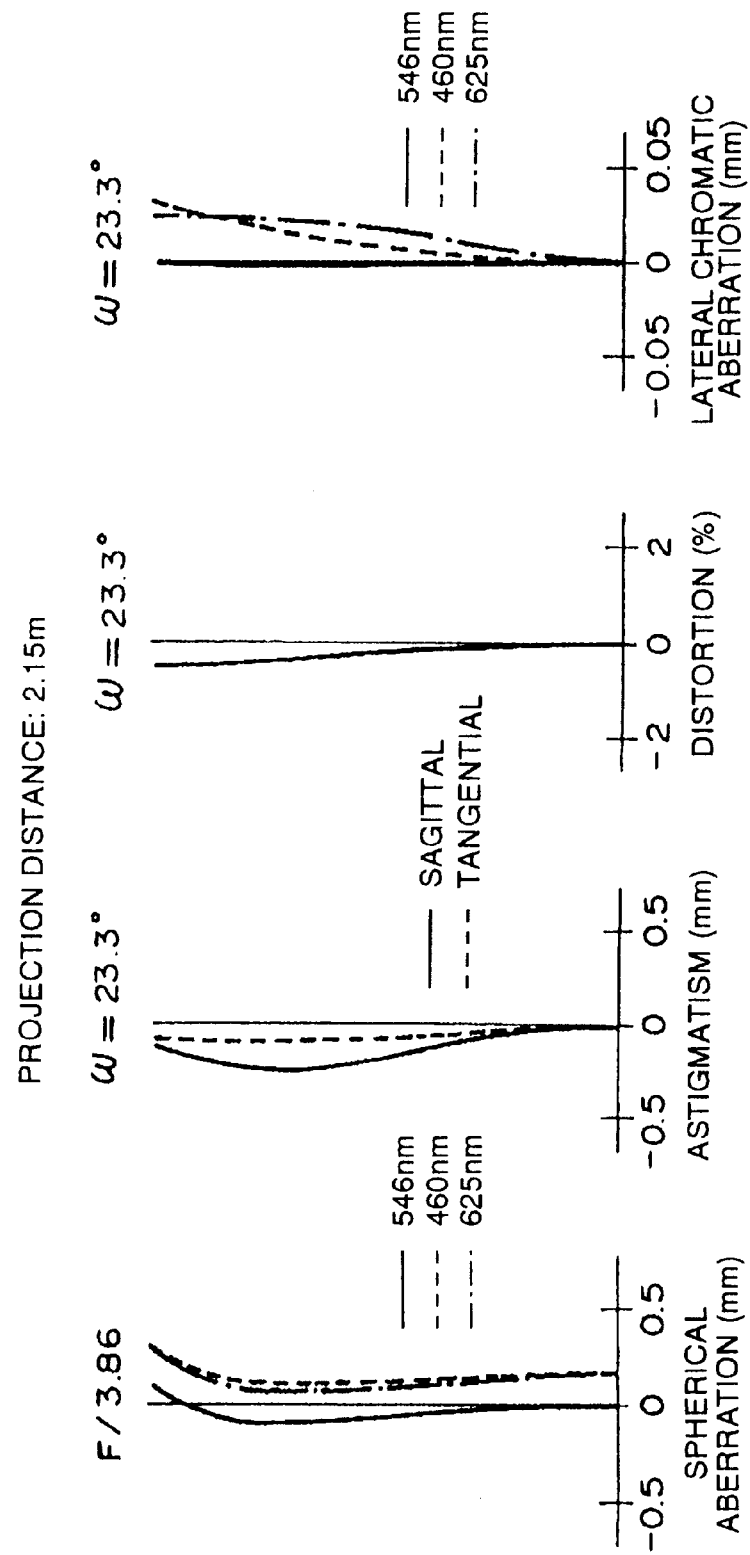
FIGS. 4A–4D are graphical views showing curves of spherical aberrations for wavelengths of 460, 546 and 625 nm, astigmatism in sagittal and tangential planes, distortion, and lateral chromatic aberrations for wavelengths of 460, 546 and 625 nm of the telecentric projection lens system of FIG. 2, which is at an intermediate projecting distance of 2.15 m.
Figure 5:
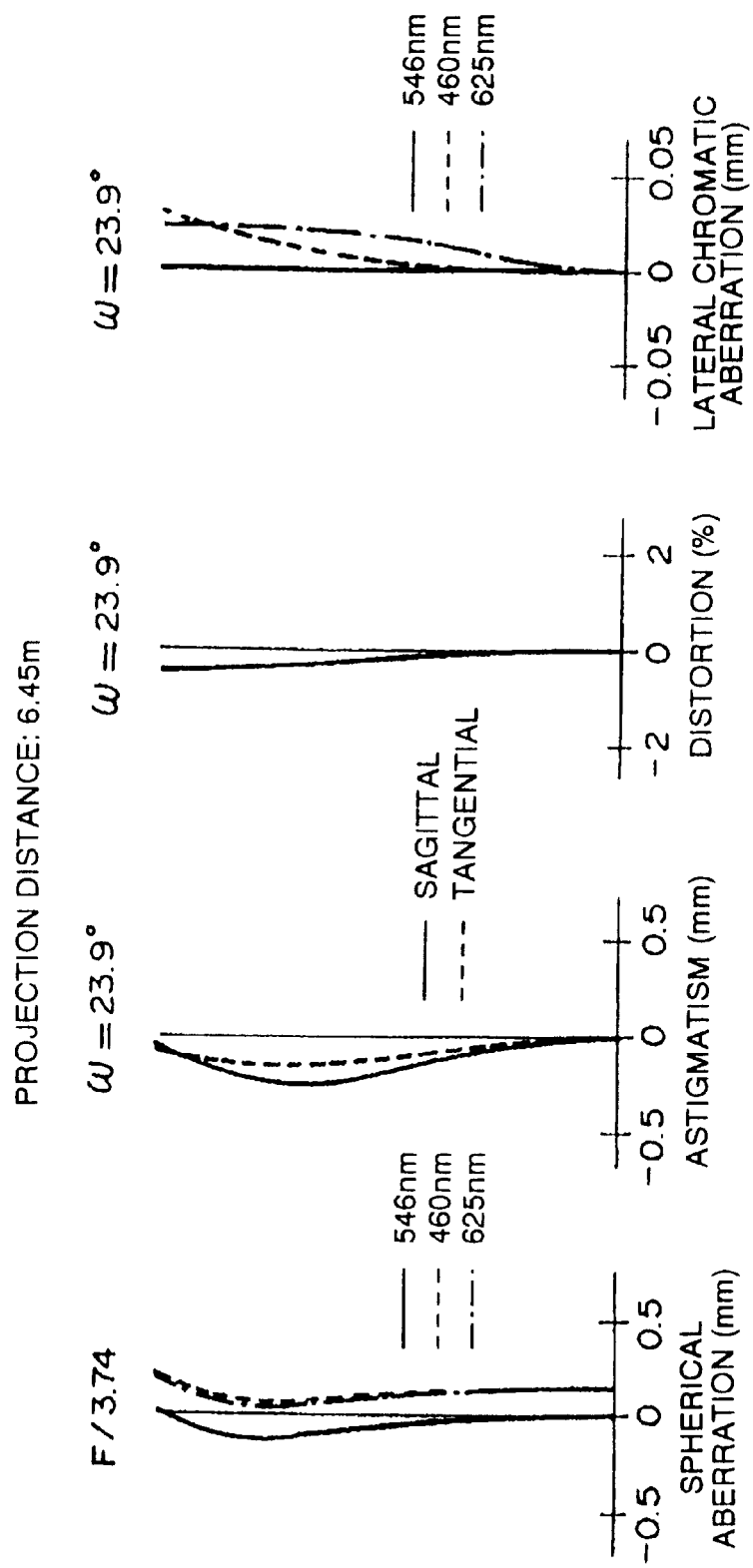
FIGS. 5A–5D are graphical views showing curves of spherical aberrations for wavelengths of 460, 546 and 625 nm, astigmatism in sagittal and tangential planes, distortion, and lateral chromatic aberrations for wavelengths of 460, 546 and 625 nm of the telecentric projection lens system of FIG. 2, which is at a long projecting distance of 6.45 m.
Figure 6:
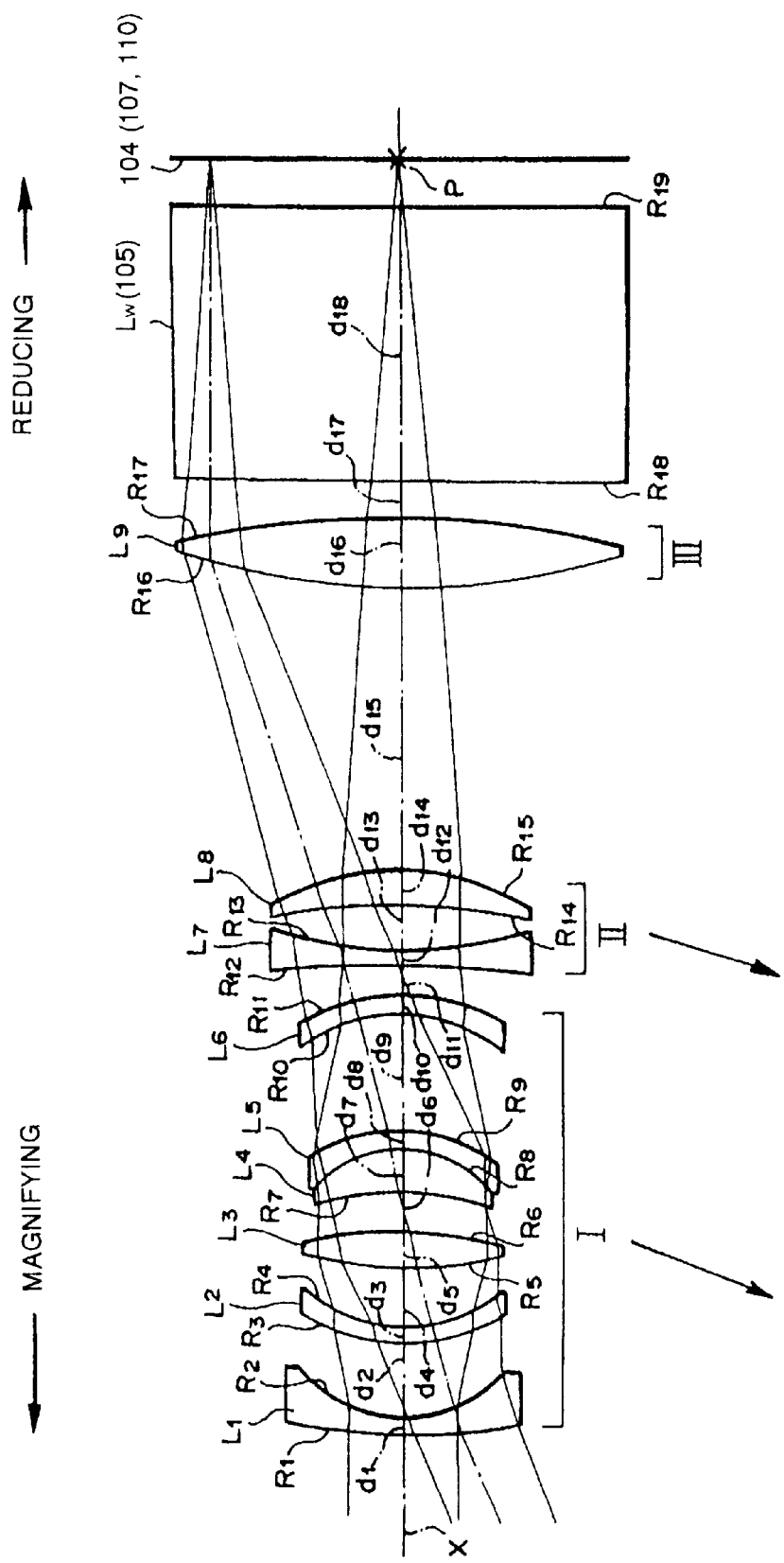
FIG. 6 is a diagrammatic side view of an optical structure of a telecentric projection lens system, which is at a standard projecting distance, in accordance with another embodiment of the invention.
Figure 7:
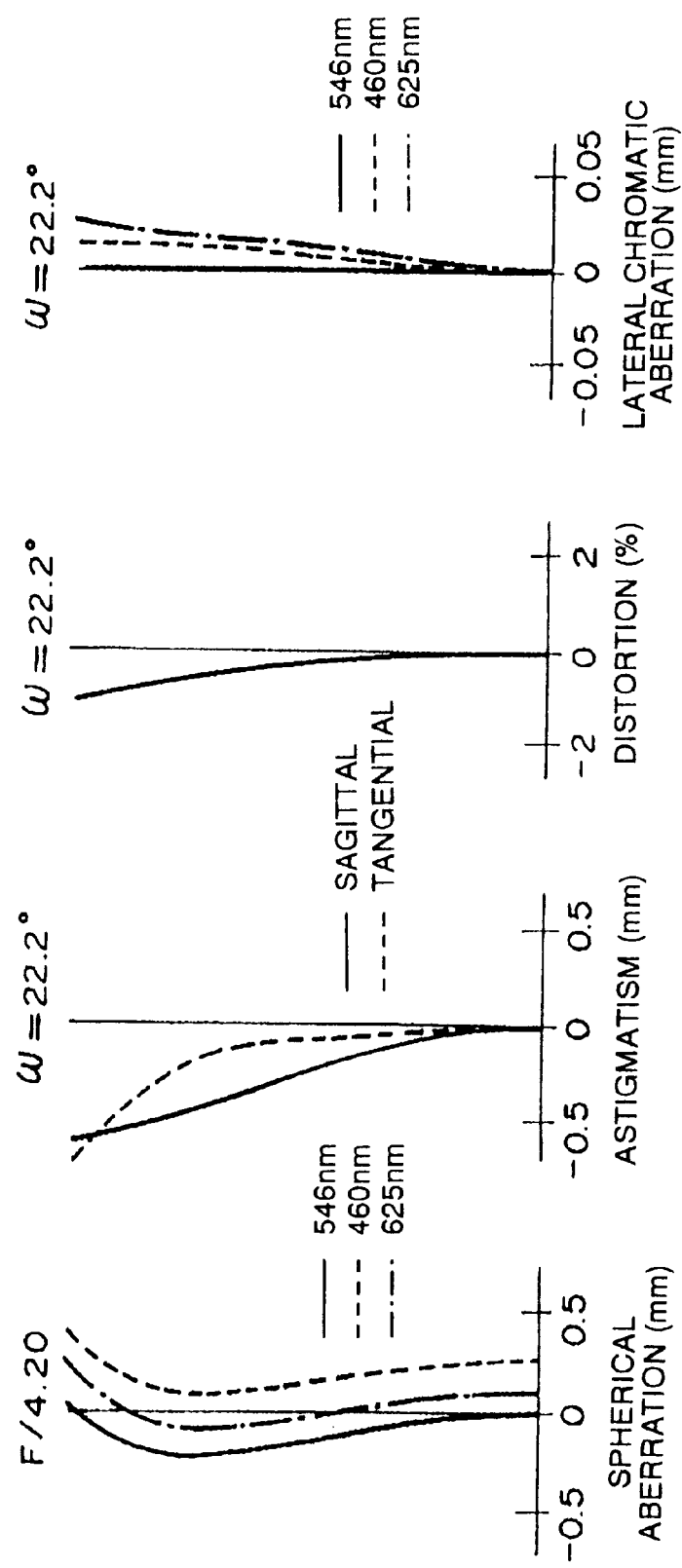
FIGS. 7A–7D are graphical views showing curves of spherical aberrations for wavelengths of 460, 546 and 625 nm, astigmatism in sagittal and tangential planes, distortion, and lateral chromatic aberrations for wavelengths of 460, 546 and 625 nm of the telecentric projection lens system of FIG. 6, which is at a short projecting distance of 0.86 m.
Figure 8:
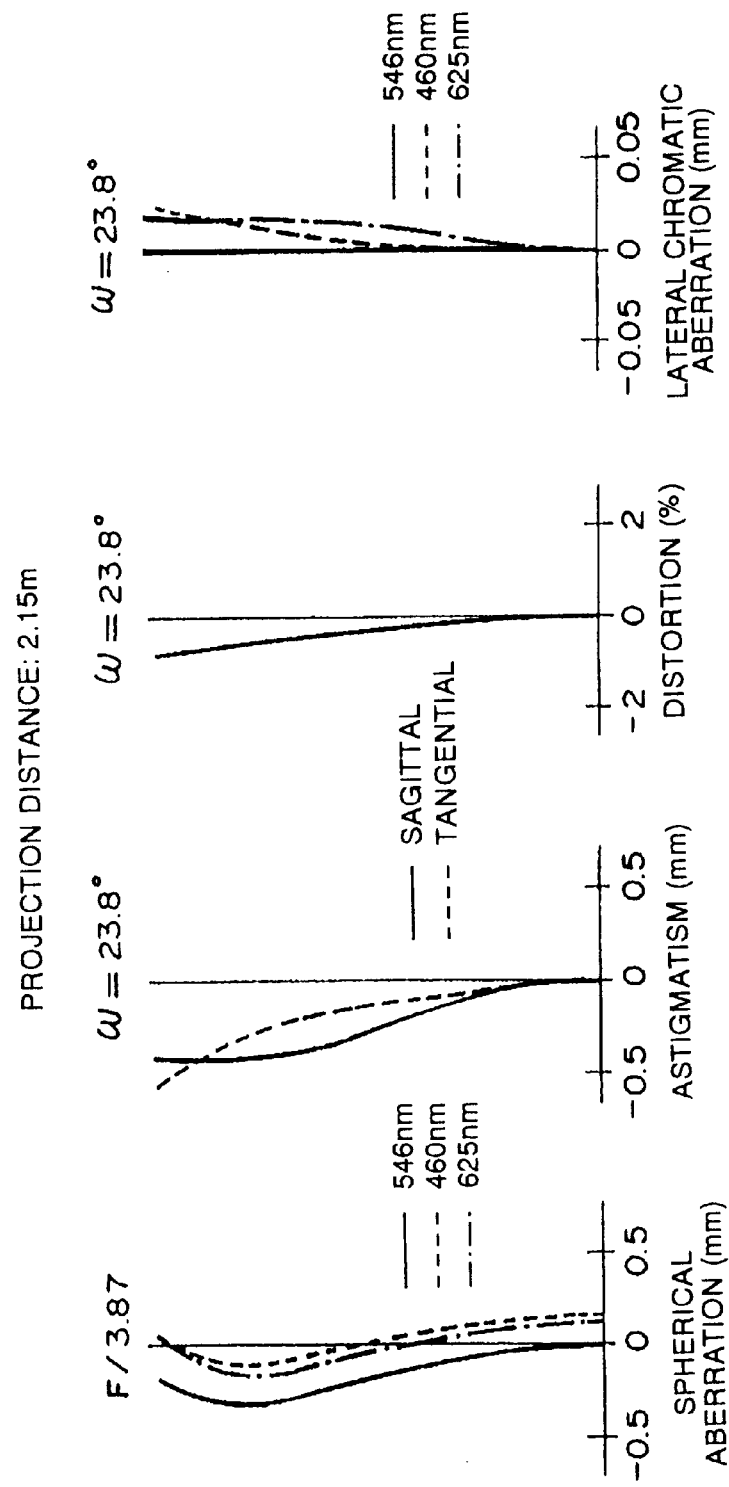
FIGS. 8A–8D are graphical views showing curves of spherical aberrations for wavelengths of 460, 546 and 625 nm, astigmatism in sagittal and tangential planes, distortion, and lateral chromatic aberrations for wavelengths of 460, 546 and 625 nm of the telecentric projection lens system of FIG. 6, which is at an intermediate projecting distance of 2.15 m.
Figure 9:
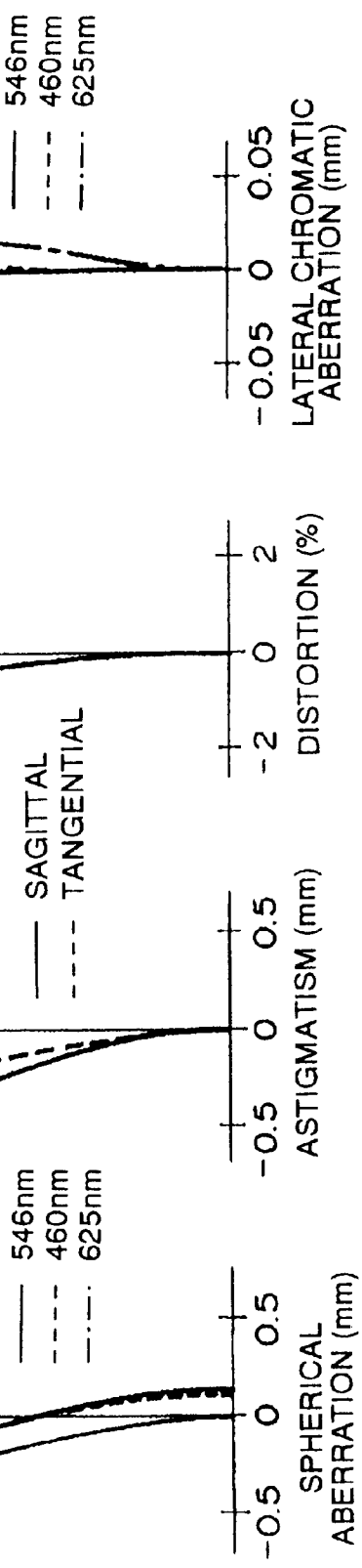
FIGS. 9A–9D are graphical views showing curves of spherical aberrations for wavelengths of 460, 546 and 625 nm, astigmatism in sagittal and tangential planes, distortion, and lateral chromatic aberrations for wavelengths of 460, 546 and 625 nm of the telecentric projection lens system of FIG. 6, which is at a long projecting distance of 6.45 m.
Figure 10:
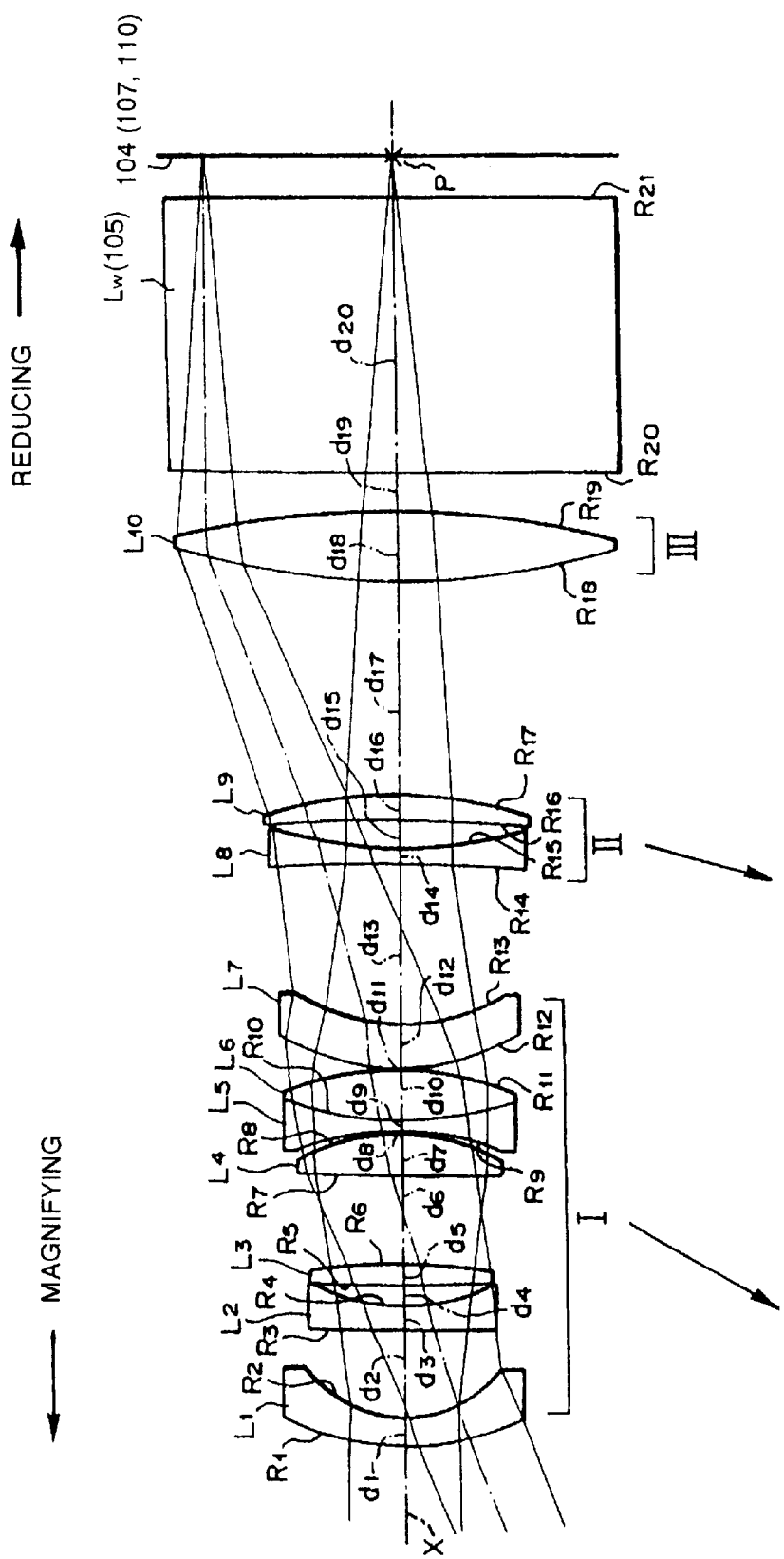
FIG. 10 is a diagrammatic side view of an optical structure of a telecentric projection lens system, which is at a standard projecting distance, in accordance with still another embodiment of the invention.

FIGS. 2, 6 and 10 show telecentric projection lens systems 111A, 111B and 111C in accordance with first to third embodiments of the invention, respectively, which are at a standard projection distance. The telecentric projection lens system 111A, 111B, 111C comprises three lens groups, namely a positive power first lens group I, a negative power second lens group II and a positive power third lens group III arranged in order from the magnifying side to the reducing side and is equipped with a color mixing element 2 such as a dichroic prism between the third lens group III and the image surface 1, i.e. the surface of each liquid crystal display panel 104, 107, 110.

The first lens group I comprises basically six lens components including at least two meniscus lenses, namely first and second concave meniscus lenses, and a doublet in order from the magnifying side. The second lens group II comprises two lens component, namely a concave lens and a convex lens in order from the magnifying side side. The third lens group III comprises a single lens component such as a convex lens.

The third lens group III is always fixed, and the first and second lens groups I and II are moved relative to each other and relative to the stationary lens group III during focusing.

The telecentric projection lens system 111A, 111B, 111C must satisfy the following conditions:

| | |
|---|---|
| $0.75 < f1/f < 1.20$ | (I) |
| $f2/f < -1.20$ | (II) |
| $1.20 < f3/f < 1.70$ | (III) |
| $N1 < 1.6$ | (IV) |
| $N2 < 1.6$ | (V) |
| $\nu 1 > 50$ | (VI) |
| $\nu 2 > 50$ | (VII) |
| $0.5 < S2/S1 < 1.0$ | (VIII) | where f is the overall focal length of the telecentric projection lens system at the standard projection distance, f1, f2 and f3 are the focal lengths of the first, second and third lens groups, respectively, N1 and N2 are the refraction factors of the two meniscus lens elements of the first lens group I, respectively, υ1 and υ2 are the dispersions of the two meniscus lens elements of the first lens group I, respectively, as measured by the Abbe Number, and S1 and S2 ate the length of movement of the first and second lens groups I and II, respectively.

The following description will be directed to the first to third telecentric projection lens systems embodying the present invention.

In the following tables, the embodiments of the invention are set forth for various projection distances, with parameters of the invention. In the following prescription tables, the reference L followed by an Arabic numeral indicates the lens element progressively from the magnifying side to the reducing side of the telecentric projection lens system. The reference radius numbers R are the progressive lens surface radii. Positive surface radii are struck from the right of the lens surface on the optical axis X, and negative surface radii are struck from the left of the lens surface on the optical axis X. The index of refraction is given by Nd, the dispersion is given measured by the Abbe Number as given by υd. The reference distance numbers d are the progressive axial distances between adjacent surfaces. The focus spacing D are spaces between lens groups which vary with a change in projection distance.

An telecentric projection lens system 111A as shown in FIG. 2, 3A-2D, 4A–4D and 5A–5D scaled to an f-number of 3.86 and an image size of 87 mm is substantially described in Table I.

TABLE I

| Element | Radius of Curvature(mm) | Axial Distance Between Surfaces(mm) | $N_d$ | $v_d$ |
|---|---|---|---|---|
| $L_1$ | $R_1$ = 62.320 | $d_1$ = 3.500 | 1.48749 | 70.2 |
|  | $R_2$ = 27.601 | $d_2$ = 21.235 |  |  |
| $L_2$ | $R_3$ = 96.697 | $d_3$ = 3.500 | 1.48749 | 70.2 |
|  | $R_4$ = 50.662 | $d_4$ = 12.571 |  |  |
| $L_3$ | $R_5$ = 249.950 | $d_5$ = 5.287 | 1.77250 | 49.6 |
|  | $R_6$ = −93.375 | $d_6$ = 5.982 |  |  |
| $L_4$ | $R_7$ = −48.340 | $d_7$ = 9.530 | 1.62041 | 60.3 |
|  | $R_8$ = −29.832 |  |  |  |
| $L_5$ | $R_8$ = −29.832 | $d_8$ = 5.000 | 1.80518 | 25.4 |
|  | $R_9$ = −38.864 | $d_9$ = 0.500 |  |  |
| $L_6$ | $R_{10}$ = −453.730 | $d_{10}$ = 5.000 | 1.74320 | 49.3 |
|  | $R_{11}$ = −152.500 | $d_{11}$ = D1 |  |  |
| $L_7$ | $R_{12}$ = −422.090 | $d_{12}$ = 3.500 | 1.84666 | 23.8 |
|  | $R_{13}$ = 96.759 | $d_{13}$ = 7.499 |  |  |
| $L_8$ | $R_{14}$ = −299.470 | $d_{14}$ = 6.242 | 1.74320 | 25.4 |
|  | $R_{15}$ = −95.095 | $d_{15}$ = D2 |  |  |
| $L_9$ | $R_{16}$ = 156.790 | $d_{16}$ = 16.424 | 1.62041 | 60.3 |
|  | $R_{17}$ = −218.490 | $d_{17}$ = 9.250 |  |  |
| $L_W$ | $R_{18}$ = ∞ | $d_{18}$ = 63.715 | 1.51633 | 64.1 |
|  | $R_{19}$ = ∞ |  |  |  |

| Focus Spacing | | |
|---|---|---|
| Projection Distance (m) | D1 (mm) | D2 (mm) |
| 6.45 | 56.297 | 45.956 |
| 2.15 | 56.932 | 53.690 |
| 0.86 | 58.450 | 72.209 |

Telecentric projection lens system 111A depicted in FIG. 2 and described in prescription Table I has the parameters as follows:

| f(mm) | $f_1/f$ | $f_2/f$ | $f_3/f$ | $N_1$ | $N_2$ | v1 | v2 | S2/S1 |
|---|---|---|---|---|---|---|---|---|
| 101.6 | 0.90 | −2.13 | 1.47 | 1.487 | 1.487 | 70.2 | 70.2 | 0.92 |

As apparent, the telecentric projection lens system 111A depicted in FIG. 2 and described in prescription Table I satisfies the conditions (I)–(VIII).

Spherical aberrations for wavelengths of 460 nm, 546 nm and 625 nm, astigmatism in sagittal and tangential planes, distortion, and lateral chromatic aberrations for wavelengths of 460 nm, 546 nm and 625 nm of the telecentric projection lens system 111A at a short projection distance of 0.86 m, an intermediate projection distance of 2.15 m and a long projection distance of 6.45 m are shown in FIGS. 3A–3D, 4A–4D and 5A–5D, respectively. As apparent from FIGS. 3A–3D, 4A–4D and 5A–5D, the telecentric projection lens system 111A has well balanced aberrations and imaging performance over the entire area of field-of-view and over the entire focusing range.

An telecentric projection lens system 111B suitable as shown in FIG. 6, 7A–7D, 8A–8D and 9A–9D scaled to an f-number of 3.87 and an image size of 87 mm is substantially described in Table II.

TABLE II

| Element | Radius of Curvature(mm) | Axial Distance Between Surfaces(mm) | $N_d$ | $v_d$ |
|---|---|---|---|---|
| $L_1$ | $R_1$ = 145.720 | $d_1$ = 3.750 | 1.51633 | 64.1 |
|  | $R_2$ = 31.346 | $d_2$ = 17.395 |  |  |
| $L_2$ | $R_3$ = 42.314 | $d_3$ = 3.750 | 1.51633 | 64.1 |
|  | $R_4$ = 33.270 | $d_4$ = 13.955 |  |  |
| $L_3$ | $R_5$ = 86.950 | $d_5$ = 8.550 | 1.70154 | 41.2 |
|  | $R_6$ = −86.950 | $d_6$ = 9.225 |  |  |
| $L_4$ | $R_7$ = −65.785 | $d_7$ = 9.800 | 1.70154 | 41.2 |
|  | $R_8$ = −27.473 |  |  |  |
| $L_5$ | $R_8$ = −27.473 | $d_8$ = 4.000 | 1.84666 | 23.8 |
|  | $R_9$ = −40.656 | $d_9$ = 27.690 |  |  |
| $L_6$ | $R_{10}$ = −34.543 | $d_{10}$ = 3.750 | 1.84666 | 23.8 |
|  | $R_{11}$ = −43.745 | $d_{11}$ = D1 |  |  |
| $L_7$ | $R_{12}$ = −354.460 | $d_{12}$ = 3.750 | 1.84666 | 23.8 |
|  | $R_{13}$ = 101.560 | $d_{13}$ = 10.290 |  |  |
| $L_8$ | $R_{14}$ = −145.220 | $d_{14}$ = 7.650 | 1.62041 | 60.3 |
|  | $R_{15}$ = −58.310 | $d_{15}$ = D2 |  |  |
| $L_9$ | $R_{16}$ = 170.240 | $d_{16}$ = 16.000 | 1.65844 | 50.9 |
|  | $R_{17}$ = −224.460 | $d_{17}$ = 9.135 |  |  |
| $L_W$ | $R_{18}$ = ∞ | $d_{18}$ = 63.715 | 1.51633 | 64.1 |
|  | $R_{19}$ = ∞ |  |  |  |

| Focus Spacing | | |
|---|---|---|
| Projection Distance (m) | D1 (mm) | D2 (mm) |
| 6.45 | 6.613 | 57.983 |
| 2.15 | 7.052 | 66.333 |
| 0.86 | 8.119 | 86.606 |

Telecentric projection lens system 111A depicted in FIG. 6 and described in prescription Table II has the parameters as follows:

| f(mm) | $f_1/f$ | $f_2/f$ | $f_3/f$ | $N_1$ | $N_2$ | v1 | v2 | S2/S1 |
|---|---|---|---|---|---|---|---|---|
| 99.3 | 1.01 | −3.49 | 1.50 | 1.516 | 1.516 | 64.1 | 64.1 | 0.95 |

As apparent, the telecentric projection lens system 111B depicted in FIG. 6 and described in prescription Table II satisfies the conditions (I)–(VIII).

Spherical aberrations for wavelengths of 460 nm, 546 nm and 625 nm, astigmatism in sagittal and tangential planes, distortion, and lateral chromatic aberrations for wavelengths of 460 nm, 546 nm and 625 nm of the telecentric projection lens system 111B at a short projection distance of 0.86 m, an intermediate projection distance of 2.15 m and a long projection distance of 6.45 m are shown in FIGS. 7A–7D, 8A–8D and 9A–9D, respectively. As apparent from FIGS. 7A–7D, 8A–8D and 9A–9D, the telecentric projection lens system 111B has well balanced aberrations and imaging performance over the entire area of field-of-view and over the range of focusing.

An telecentric projection lens system 111C suitable as shown in FIG. 10, 11A–11D, 12A–12D and 13A–13D scaled to an f-number of 3.80 and an image size of 87 mm is substantially described in Table III.

TABLE III

| Element | Radius of Curvature(mm) | Axial Distance Between Surfaces(mm) | $N_d$ | $v_d$ |
|---|---|---|---|---|
| $L_1$ | $R_1$ = 63.727 | $d_1$ = 6.000 | 1.48749 | 70.2 |
|  | $R_2$ = 30.261 | $d_2$ = 19.962 |  |  |
| $L_2$ | $R_3$ = 1306.900 | $d_3$ = 6.000 | 1.48749 | 70.2 |
|  | $R_4$ = 53.512 | $d_4$ = 4.168 |  |  |
| $L_3$ | $R_5$ = 268.040 | $d_5$ = 4.782 | 1.80518 | 25.4 |
|  | $R_6$ = −140.670 | $d_6$ = 21.328 |  |  |
| $L_4$ | $R_7$ = −9366.400 | $d_7$ = 9.613 | 1.67003 | 47.3 |
|  | $R_8$ = −46.582 | $d_8$ = 0.795 |  |  |
| $L_5$ | $R_9$ = −60.534 | $d_9$ = 2.750 | 1.68893 | 31.1 |
|  | $R_{10}$ = 79.523 |  |  |  |
| $L_6$ | $R_{10}$ = 79.523 | $d_{10}$ = 11.380 | 1.62041 | 60.3 |
|  | $R_{11}$ = −67.404 | $d_{11}$ = 0.500 |  |  |
| $L_7$ | $R_{12}$ = 52.593 | $d_{12}$ = 10.000 | 1.80518 | 25.4 |
|  | $R_{13}$ = 47.367 | $d_{13}$ = D1 |  |  |
| $L_8$ | $R_{14}$ = −494.100 | $d_{14}$ = 4.000 | 1.80514 | 25.4 |
|  | $R_{15}$ = 95.260 | $d_{15}$ = 6.618 |  |  |
| $L_9$ | $R_{16}$ = −341.970 | $d_{16}$ = 5.802 | 1.62041 | 60.3 |
|  | $R_{17}$ = −93.753 | $d_{17}$ = D2 |  |  |
| $L_9$ | $R_{18}$ = 171.380 | $d_{18}$ = 16.294 | 1.72342 | 38.0 |
|  | $R_{19}$ = −211.780 | $d_{19}$ = 9.250 |  |  |
| $L_W$ | $R_{20}$ = ∞ | $d_{20}$ = 63.715 | 1.51633 | 64.1 |
|  | $R_{21}$ = ∞ |  |  |  |

| Focus Spacing | | |
|---|---|---|
| Projection Distance (m) | D1 (mm) | D2 (mm) |
| 6.45 | 36.579 | 46.249 |
| 2.15 | 38.619 | 50.173 |
| 0.86 | 43.347 | 59.266 |

Telecentric projection lens system 111C depicted in FIG. 10 and described in prescription Table III has the parameters as follows:

| f(mm) | $f_1/f$ | $f_2/f$ | $f_3/f$ | $N_1$ | $N_2$ | v1 | v2 | S2/S1 |
|---|---|---|---|---|---|---|---|---|
| 100.3 | 0.98 | −2.13 | 1.33 | 1.487 | 1.487 | 70.2 | 70.2 | 0.66 |

As apparent, the telecentric projection lens system 111C depicted in FIG. 10 and described in prescription Table III satisfies the conditions (I)–(VIII).

Spherical aberrations for wavelengths of 460 nm, 546 nm and 625 nm, astigmatism in sagittal and tangential planes, distortion, and lateral chromatic aberrations for wavelengths of 460 nm, 546 nm and 625 nm of the telecentric projection lens system 111C at a short projection distance of 0.86 m, an intermediate projection distance of 2.15 m and a long projection distance of 6.45 m are shown in FIGS. 11A–11D, 12A–12D and 13A–13D, respectively. As apparent from FIGS. 11A–11D, 12A–12D and 13A–13D, the telecentric projection lens system has well balanced aberrations and imaging performance over the entire area of field-of-view and over the range of focusing.

It is to be understood that the present invention may be embodied with various changes, modifications and improvements, which may occur to those skilled in the art, without departing from the spirit and scope of the invention defined in the following claims.

What is claimed is:

1. A telecentric projection lens system comprising, in order from the magnifying side to the reducing side, a positive power first lens group including, in order from the magnifying side, at least first and second concave meniscus lens elements and one cemented lens element, a negative power second lens group comprising a concave lens element and a convex meniscus lens element, and a positive power third lens group, said telecentric projection lens system satisfying the following conditions:

$$0.75 < f1/f < 1.20$$

$$f2/f < -1.20$$

$$1.20 < f3/f < 1.70$$

where f is the overall focal length of the telecentric projection lens system at the standard projection distance, f1, f2 and f3 are the focal lengths of the first, second and third lens groups.

2. The telecentric projection lens system as defined in claim 1, wherein said third lens group comprises a single bi-convex lens element.

3. The telecentric projection lens system as defined in claim 1, and further satisfying the following conditions:

$$N1 < 1.6$$

$$N2 < 1.6$$

$$v1 > 50$$

$$v2 > 50$$

where N1 and N2 are the refraction factors of the first and second concave meniscus lens elements of the first lens group, respectively, and v1 and v2 are the dispersions of the first and second concave meniscus lens elements of the first lens group, respectively, as measured by the Abbe Number.

4. The telecentric projection lens system as defined in claim 3, wherein said third lens group comprises a single bi-convex lens element.

5. The telecentric projection lens system as defined in claim 3, wherein the third lens group is always fixed, and the first and second lens groups are movable relative to each other and relative to the third lens group during focusing and further satisfies the following conditions:

$$0.5 < S2/S1 < 1.0$$

where S1 and S2 are the length of movement of the first and second lens groups during focusing, respectively.

6. The telecentric projection lens system as defined in claim 5, wherein said third lens group comprises a single bi-convex lens element.

7. The telecentric projection lens system as defined in claim 5, wherein said first and second lens groups are movable at a fixed relative ratio of movement.

8. The telecentric projection lens system as defined in claim 5, wherein said first lens group comprises in order from the magnifying side first and second concave meniscus lens elements L1 and L2, a lens element L3, a cemented doublet consisting of lens elements L4 and L5 and a lens element L6, said second lens group comprises in order from the magnifying side a concave lens element L7 and a convex lens element L8, and said third lens group comprises a bi-convex lens element L9.

9. The telecentric projection lens system as defined in claim 8 scaled to an f-number of 3.86 and an image size of 87 mm substantially as described:

| Element | Radius of Curvature(mm) | Axial Distance Between Surfaces(mm) | $N_d$ | $v_d$ |
|---|---|---|---|---|
| $L_1$ | $R_1 = 62.320$ | $d_1 = 3.500$ | 1.48749 | 70.2 |
|  | $R_2 = 27.601$ | $d_2 = 21.235$ |  |  |
| $L_2$ | $R_3 = 96.697$ | $d_3 = 3.500$ | 1.48749 | 70.2 |
|  | $R_4 = 50.662$ | $d_4 = 12.571$ |  |  |
| $L_3$ | $R_5 = 249.950$ | $d_5 = 5.287$ | 1.77250 | 49.6 |
|  | $R_6 = -93.375$ | $d_6 = 5.982$ |  |  |
| $L_4$ | $R_7 = -48.340$ | $d_7 = 9.530$ | 1.62041 | 60.3 |
|  | $R_8 = -29.832$ |  |  |  |
| $L_5$ | $R_8 = -29.832$ | $d_8 = 5.000$ | 1.80518 | 25.4 |
|  | $R_9 = -38.864$ | $d_9 = 0.500$ |  |  |
| $L_6$ | $R_{10} = -453.730$ | $d_{10} = 5.000$ | 1.74320 | 49.3 |
|  | $R_{11} = -152.500$ | $d_{11} = D1$ |  |  |
| $L_7$ | $R_{12} = -422.090$ | $d_{12} = 3.500$ | 1.84666 | 23.8 |
|  | $R_{13} = 96.759$ | $d_{13} = 7.499$ |  |  |
| $L_8$ | $R_{14} = -299.470$ | $d_{14} = 6.242$ | 1.74320 | 25.4 |
|  | $R_{15} = -95.095$ | $d_{15} = D2$ |  |  |
| $L_9$ | $R_{16} = 156.790$ | $d_{16} = 16.424$ | 1.62041 | 60.3 |
|  | $R_{17} = -218.490$ |  |  |  |

| Focus Spacing | | |
|---|---|---|
| Projection Distance (m) | D1 (mm) | D2 (mm) |
| 6.45 | 56.297 | 45.956 |
| 2.15 | 56.932 | 53.690 |
| 0.86 | 58.450 | 72.209 | where the reference radius numbers R are the progressive lens surface radii, the reference distance numbers d are the progressive axial distances between adjacent surfaces, the index of refraction is given by Nd, the dispersion is given measured by the Abbe Number as given by $v_d$, and D1 and D2 are the variable air spacings at the indicated projection distance.

10. The telecentric projection lens system as defined in claim 8 scaled to an f-number of 3.87 and an image size of 87 mm substantially as described:

| Element | Radius of Curvature(mm) | Axial Distance Between Surfaces(mm) | $N_d$ | $v_d$ |
|---|---|---|---|---|
| $L_1$ | $R_1 = 145.720$ | $d_1 = 3.750$ | 1.51633 | 64.1 |
|  | $R_2 = 31.346$ | $d_2 = 17.395$ |  |  |
| $L_2$ | $R_3 = 42.314$ | $d_3 = 3.750$ | 1.51633 | 64.1 |
|  | $R_4 = 33.270$ | $d_4 = 13.955$ |  |  |
| $L_3$ | $R_5 = 86.950$ | $d_5 = 8.550$ | 1.70154 | 41.2 |
|  | $R_6 = -86.950$ | $d_6 = 9.225$ |  |  |
| $L_4$ | $R_7 = -65.785$ | $d_7 = 9.800$ | 1.70154 | 41.2 |
|  | $R_8 = -27.473$ |  |  |  |
| $L_5$ | $R_8 = -27.473$ | $d_8 = 4.000$ | 1.84666 | 23.8 |
|  | $R_9 = -40.656$ | $d_9 = 27.690$ |  |  |
| $L_6$ | $R_{10} = -34.543$ | $d_{10} = 3.750$ | 1.84666 | 23.8 |
|  | $R_{11} = -43.745$ | $d_{11} = D1$ |  |  |
| $L_7$ | $R_{12} = -354.460$ | $d_{12} = 3.750$ | 1.84666 | 23.8 |
|  | $R_{13} = 101.560$ | $d_{13} = 10.290$ |  |  |
| $L_8$ | $R_{14} = -145.220$ | $d_{14} = 7.650$ | 1.62041 | 60.3 |
|  | $R_{15} = -58.310$ | $d_{15} = D2$ |  |  |
| $L_9$ | $R_{16} = 170.240$ | $d_{16} = 16.000$ | 1.65844 | 50.9 |
|  | $R_{17} = -224.460$ |  |  |  |

| Focus Spacing | | |
|---|---|---|
| Projection Distance (m) | D1 (mm) | D2 (mm) |
| 6.45 | 6.613 | 57.983 |
| 2.15 | 7.052 | 66.333 |
| 0.86 | 8.119 | 86.606 | where the reference radius numbers R are the progressive lens surface radii, the reference distance numbers d are the progressive axial distances between adjacent surfaces, the index of refraction is given by Nd, the dispersion is given measured by the Abbe Number as given by $v_d$, and D1 and D2 are the variable air spacings at the indicated projection distance.

11. The telecentric projection lens system as defined in claim 5, wherein said first lens group comprises in order from the magnifying side side first and second concave meniscus lens elements L1 and L2, lens elements L3 and L4, a cemented doublet consisting of lens elements L5 and L6 and a lens element L7, said second lens group comprises in order from the magnifying side side a concave lens element L8 and a convex lens element L9, and said third lens group comprises a bi-convex lens element L10.

12. The telecentric projection lens system as defined in claim 11 scaled to an f-number of 3.80 and an image size of 87 mm substantially as described:

| Element | Radius of Curvature(mm) | Axial Distance Between Surfaces(mm) | $N_d$ | $v_d$ |
|---|---|---|---|---|
| $L_1$ | $R_1 = 63.727$ | $d_1 = 6.000$ | 1.48749 | 70.2 |
|  | $R_2 = 30.261$ | $d_2 = 19.962$ |  |  |
| $L_2$ | $R_3 = 1306.900$ | $d_3 = 6.000$ | 1.48749 | 70.2 |
|  | $R_4 = 53.512$ | $d_4 = 4.168$ |  |  |
| $L_3$ | $R_5 = 268.040$ | $d_5 = 4.782$ | 1.80518 | 25.4 |
|  | $R_6 = -140.670$ | $d_6 = 21.328$ |  |  |
| $L_4$ | $R_7 = -9366.400$ | $d_7 = 9.613$ | 1.67003 | 47.3 |
|  | $R_8 = -46.582$ | $d_8 = 0.795$ |  |  |
| $L_5$ | $R_9 = -60.534$ | $d_9 = 2.750$ | 1.68893 | 31.1 |
|  | $R_{10} = 79.523$ |  |  |  |
| $L_6$ | $R_{10} = 79.523$ | $d_{10} = 11.380$ | 1.62041 | 60.3 |
|  | $R_{11} = -67.404$ | $d_{11} = 0.500$ |  |  |
| $L_7$ | $R_{12} = 52.593$ | $d_{12} = 10.000$ | 1.80518 | 25.4 |
|  | $R_{13} = 47.367$ | $d_{13} = D1$ |  |  |
| $L_8$ | $R_{14} = -494.100$ | $d_{14} = 4.000$ | 1.80514 | 25.4 |
|  | $R_{15} = 95.260$ | $d_{15} = 6.618$ |  |  |
| $L_9$ | $R_{16} = -341.970$ | $d_{16} = 5.802$ | 1.62041 | 60.3 |
|  | $R_{17} = -93.753$ | $d_{17} = D2$ |  |  |
| $L_{10}$ | $R_{18} = 171.380$ | $d_{18} = 16.294$ | 1.72342 | 38.0 |
|  | $R_{19} = -211.780$ |  |  |  |

| Focus Spacing | | |
|---|---|---|
| Projection Distance (m) | D1 (mm) | D2 (mm) |
| 6.45 | 36.579 | 46.249 |
| 2.15 | 38.619 | 50.173 |
| 0.86 | 43.347 | 59.266 | where the reference radius numbers R are the progressive lens surface radii, the reference distance numbers d are the progressive axial distances between adjacent surfaces, the index of refraction is given by Nd, the dispersion is given measured by the Abbe Number as given by $v_d$, and D1 and D2 are the variable air spacings at the indicated projection distance.

* * * * *